Patented Apr. 10, 1934

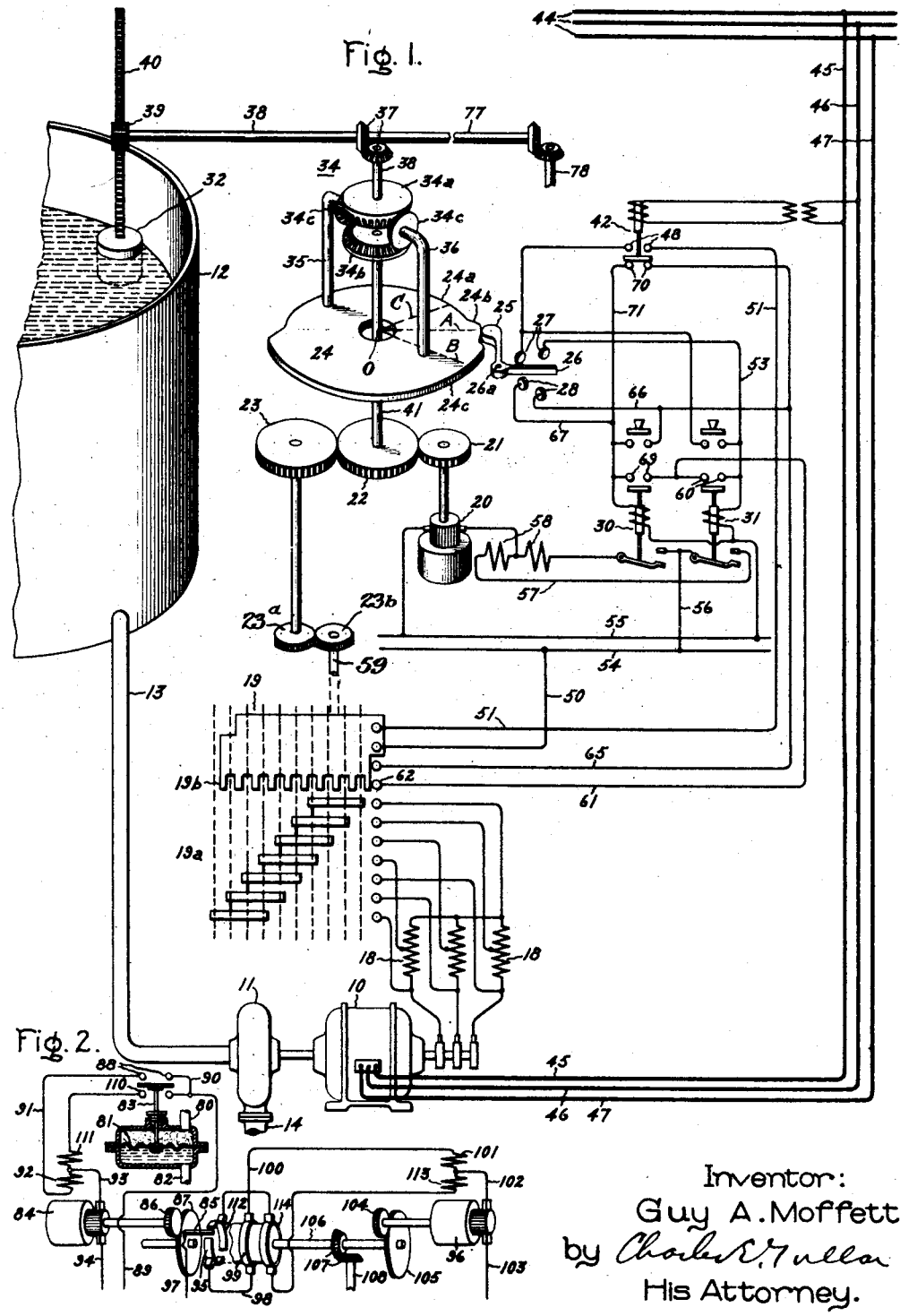

1,954,142

UNITED STATES PATENT OFFICE 1,954,142

CONTROL SYSTEM

Guy A. Moffett, Scotia, N. Y., assignor to General Electric Company, a corporation of New York Application October 15, 1931, Serial No. 568,999

10 Claims. (Cl. 172—239)

My invention relates to control systems and more particularly to a means for controlling the speed of electric motors in accordance with varying speed demands and has for an object the provision of a simple and reliable control system of this character.

In carrying out my invention in one form, I provide a control member actuated in accordance with the degree of speed control required, together with means for carrying out the desired speed control and for restoring the control member to its initial position.

This result may of course be accomplished in a variety of ways, the principle of my invention having once been explained. The preferred means of which I make use however, includes a differential mechanism one member of which is rotated an amount which is proportional to the degree of speed or load control desired. The other member of the differential is geared to a motor operated drum controller while the pinion gears drive a control cam which is arranged to control the energization of the drum controller motor.

I have found that my invention is particularly applicable to the operation and positioning of either drum or cam operated controllers and the like. Controllers of this general type must be positioned accurately for a given speed of the motor. Otherwise there is likely to be considerable heating or oven arcing and a consequent burning of the contacts. With my invention, however, controllers of this type may be continuously operated to control the speed of a driving motor in accordance with the load demand without undue damage to the contacts.

For a more complete understanding of my invention, reference should now be had to the drawing in which Fig. 1 diagrammatically shows my invention as applied to a sewage disposal plant, while Fig. 2 diagrammatically shows a modification of my invention as applied to the control of the feed water to a boiler.

Referring now to the drawing, I have shown my invention in one form as applied to the speed control of a motor 10 mechanically connected to a pump 11. The pump 11 serves to remove sewage and the like from a tank 12 through the pipes 13 and 14. As shown, the motor 10, of the slip ring induction type, is provided with the resistances 18 electrically connected to a drum controller 19. The drum controller 19 is operated by a reversible electric motor 20 through the cooperation of the meshing gears 21, 22, 23, 23a and 23b. The extent and direction of rotation of the motor 20 is determined by a control member 24 which consists of a sector cam having three lobes 24a, 24b and 24c which cooperatively engage a rider 25 which rider has a contact arm 26 arranged to selectively engage contacts 27 and 28. The direction controlling switches 30 and 31 for the motor 20 are arranged to be selectively energized whenever the contact arm 26 engages either the contacts 27 or 28. The control cam 24 is jointly positioned by the motor 20 and by a float 32 through a differential mechanism 34. It will be observed that the control cam 24 is rotatably supported from the two beveled planetary pinions or driven element 34c by means of the rigid upright members 35 and 36. The upper bevel gear or driving element 34a is arranged to be rotated in accordance with the position of the float 32 by means of the cooperation of the bevel gears 37, the shaft 38, and a gear 39 meshing with the linear gear teeth provided on the extension or gear rack 40 of the float 32. The lower bevel gear or driving element 34b is connected by a shaft 41 to the gear 22.

An undervoltage relay 42 is provided to return the controller 19 to the position corresponding to the lowest speed for the motor 10 whenever the voltage of the supply source drops a predetermined amount. This relay further serves to isolate the control cam 24 from its cooperating circuits whenever the voltage drops to a low value and the controller 19 has been returned to its off position.

With the above understanding of the elements and their organization with respect to each other in the system, the operation of the system itself and the manner in which the differential mechanism 34 and the control cam 24 cooperate with the switch 26 to vary selectively the speed of the motor 10 in accordance with the level of the liquid within the container 12, will readily be understood from the description which follows:

It will be assumed that the slip ring induction motor 10 is connected by means of conductors 45, 46 and 47 to a suitable source of three phase alternating current supply as indicated by the supply lines 44, while the control supply lines 54 and 55 are preferably energized from a suitable source of direct current supply (not shown). The motor 10 will thereupon rotate at low speed inasmuch as the resistances 18 are fully in circuit with the motor armature. The low voltage relay 42 is also energized and operates to close the contacts 48. It will also be assumed that the sewage entering the tank 12 through a suitable inlet (not shown) is flowing at a greater rate than it is being removed by the pump 11 through the pipes 13 and 14. The rising liquid level in the tank 12 therefore causes the float 32 to rise, thereby rotating the gear 39, the shaft 38 and the bevel gears 37 so that the upper bevel gear 34a is rotated in a clockwise direction. Inasmuch as the lower bevel gear 34b is connected by means of the shaft 41 to the gear 22 respectively meshing with gears 21 and 23, the lower bevel gear 34b will remain stationary. Therefore the planetary gears 34c are rotated in a counter-clockwise direction to drive the cam 24 in a clockwise direction. It will be observed that the angle through which the cam is rotated will be proportional to the change in level which occurs in the tank 12. Assuming that the rise in liquid is just sufficient to rotate the cam 24 through the angle AOC, it will be observed that the rider 25 biased against the cam surface is moved against the lobe 24a thereby rotating the contact arm 26 about its pivot 26a to complete the electrical connection between the contacts 27. The closing of the contacts 27 completes an energizing circuit for the direction controlling switch 31, which circuit may be traced from the supply line 54, conductor 50, drum controller 19, conductor 51, contacts 48, contacts 27, conductor 53, operating coil of the switch 31 and to the other supply line 55. The direction switch 31 thereupon closes to establish connection for the motor 20 for rotation in a clockwise direction. The motor 20 is of the universal type and is adapted for operation on either alternating current or direct current, consequently the source of supply as indicated by the supply lines 54 and 55 may be either. The motor circuit may be traced from supply line 54, conductor 56, direction switch 31, conductor 57, series field 58, the armature of the motor 20 and to the other supply line 55. The consequent clockwise rotation of the motor 20 drives the gear 22 in a counter-clockwise direction, the gears 23 and 23a in a clockwise direction and the gear 23b in a counter-clockwise direction. The rotation of the gear 23 carried by the shaft 59 and by means of the segments 19a serves to successively short circuit portions of the resistances 18 to increase the speed of the motor 10. However the rotation of the gear 22 with the gear 23 serves to rotate the lower bevel gear 34b of the differential mechanism 34 in a counter-clockwise direction so that the planetary gears 34c cause the cam 24 to be rotated in a counter-clockwise direction. As soon as the cam is returned through the angle COA, the follower 25 is moved outwardly by the neutral lobe 24b and thereby breaks the circuit between the contacts 27.

The direction switch 31 does not necessarily open immediately because of a holding circuit which is established by the contacts 60, operated with the direction switch 31, in cooperation with the series of positioning teeth 19b on the drum controller. This holding circuit for the operating coil of the direction switch 31, may be traced from the supply line 54, conductor 50, one of the positioning teeth 19b, conductor 61, contact 60, the operating coil of the direction switch 31 and to the other supply line 55. Whenever the contact 62 connected to the conductor 61 leaves one of the positioning teeth 19b the holding circuit is broken, consequently deenergizing the operating coil of the direction switch 31. The direction switch thereupon opens to deenergize the motor 20.

It will thus be observed that the increase of speed of the motor 10 is at all times dependent upon the angle through which the cam 24 was rotated, which in turn is dependent upon the movement of the float 32. Furthermore, it will be observed that the drum controller 19 is always positively driven to a definite drum switch position.

Assuming now that the pump 11 is removing the sewage at a greater rate than it is entering the tank 12, it is apparent that the resultant lowering of the liquid level causes the float to descend. The consequent rotation of the gear 39, the shaft 38, and the bevel gears 37 causes the upper bevel gear 34a to rotate in a counter-clockwise direction The cam 24 by means of the planetary or pinion gears 34c is rotated in a counter-clockwise direction through an angle AOB. The rider 25 is moved outwardly by means of the lobe 24c causing the contact arm 26 to complete the circuit for the direction switch 30 through the contacts 28. This circuit may be traced from the supply line 54, conductor 50, drum controller 19, conductors 65 and 66, contacts 28, conductor 67, the operating coil of the direction controlling switch 30 and to the other supply line 55. The direction switch 30 thereupon closes establishing a motor circuit which may be traced from the supply line 54, direction switch 30, series field 58, the armature of the motor 20, and to the other supply line 55. As before a holding circuit is established by means of the contacts 69, operated with the switch 30, conductor 61, and the positioning teeth 19b. The motor 20, therefore rotates in a counter-clockwise direction and by means of the gears 21, 22, 23, 23a and 23b, the drum controller 19 is rotated in a direction to decrease the speed of the motor 10 while the cam 24 is rotated in a clockwise direction through the same angle through which it was moved by the change in level in the tank 12 so that it is returned to its neutral position with the rider 25 riding on the neutral lobe 24b. It will again be observed that the change in speed of the motor 10 is a direct function of the change in liquid level of the tank 12. Therefore the speed of the motor is controlled by the load demand required to keep the liquid level constant.

If the voltage of the supply lines should decrease a predetermined amount the low voltage relay 42 is operated to open the contacts 48 and to close the contacts 70 thereby completing a circuit which causes the insertion of all of the resistance 18 into the rotor circuit of the motor 10. This circuit may be traced from the supply line 54, conductor 50, drum controller 19, conductor 65, contacts 70, conductor 71, operating coil of the direction switch 30 and to the other supply line 55. Consequent to the closing of the direction switch 30 the motor 20 is rotated in a direction to rotate the drum controller to its initial position corresponding to the lowest speed of the motor 10. The opening of the contacts 48 not only deenergizes the direction switch 31 but it also serves to isolate the control cam 24 from the motor 20 after the controller 19 has been returned to its original position with the motor 10 operating at its minimum speed and output.

As soon as the voltage returns to the supply line 44 the undervoltage relay 42 is operated to close its contacts 48 and to open its contacts 70. If the liquid level in the tank 12 has changed from its predetermined level it will be understood that the cam 24 will have been rotated to a new position and circuits will be established, as before described, to energize the motor 20 which thereby rotates the drum controller 19 to a new position determining the speed of the motor 10 with reference to the load demand or level of the liquid in the tank 12.

Although I have described my invention thus far in connection with a water tank or a sewage disposal tank, it is to be understood that my invention is equally applicable to many other applications wherein the speed of a motor is to be regulated in accordance with a variable condition. I have found that my invention is particularly applicable to a combustion regulator and it will be understood that instead of a float 32 an air volume responsive means is employed to rotate the shaft 38 so that the speed of the motor 10 will always be in proportion to the variation from a predetermined volume of air which is being supplied to a furnace or the like.

It is well understood by those skilled in the art that the amount of air which is supplied to a furnace may vary materially in accordance with the amount of steam which is being withdrawn from the boiler, that is to say the load the furnace is carrying, so that the peak loads are considerably above the rating of the furnace and that such peak loads are not encountered during normal operation.

Often the use of two motors to supply the required amount of air to the furnace is more economical than the use of a single motor To provide for the regulation of a pair of motors I provide an extension 77 of the shaft 38, and I provide a second equipment identical with the one shown in the drawing. It will be understood that the shaft 78 of the second equipment corresponds with the shaft 38 of the first equipment. Preferably however an independent source of supply is provided for the second load motor. It will thus be observed that the speed of both motors is a direct function of the amount of air that is necessary for the proper combustion in the furnace. If the voltage of one of the sources of supply should be decreased, then the corresponding undervoltage relay would drop out causing the drum controller to be rotated to a position corresponding to the lowest speed for the corresponding load motor. Inasmuch as that motor would not then be supplying its share of the air to the combustion chamber, the regulator would indicate a greater air demand and the regulator would operate the control cam of the other motor to cause the other motor to be accelerated to its full speed. As is well understood by those skilled in the art, the single motor may, for partial load on the furnace, supply sufficient air for the proper combustion of the fuel within the furnace. It will therefore be seen that the combination of the undervoltage relay on a pair of motors, the speed of which is controlled in accordance with my invention, provides a control system which automatically serves to supply the load demand under abnormal conditions (i. e. with failure of one source of power) as well as under normal conditions.

I have found that my invention is also well adapted to control the feed water supply of a boiler. Referring to Fig. 2 an indication of the feed water demand of a boiler is obtained by applying the boiler steam pressure through the pipe 80 to a diaphragm 81 while the water pressure is conducted to the other side of the diaphragm by the pipe 82. To simplify the drawing the feed water demand device shown illustrates the general principles involved in feed water control. In actual practice, as will be understood by those skilled in the art, more accurate feed water demand indicators may be employed. Whenever steam is withdrawn from the boiler the steam pressure drops and the water pressure thereupon raises the diaphragm. A rod 83 extending through the steam chamber is arranged to control the energization of a motor 84 which is geared to a control member 85 by means of the gears 86 and 87. It will thus be observed that as the steam pressure drops the contacts 88 are closed to complete an energizing circuit for the motor 84. This circuit may be traced from the supply line 89 leading from a suitable source of supply (not shown) conductor 90, contacts 88, conductor 91, series field 92, conductor 93, the armature of the motor 84, and to the other supply line 94. It will be assumed that the energization of the series field 92 causes a clockwise rotation of the motor. The control member 85 is thereby rotated in a counterclockwise direction to engage the conducting segment 95. An energizing circuit is thereby completed for the speed controlling motor 96 (corresponding in function to the motor 20 shown in Fig. 1).

This circuit may be traced from the supply line 97, control member 85, conducting segment 95, conductor 98, conducting ring 99, conductor 100, series field 101 of motor 96, conductor 102, the armature of motor 96, and to the other supply line 103. The motor 96 is thereby caused to rotate in a clockwise direction to drive the conducting segment 95, through the gears 104 and 105 and the shaft 106, in a counter-clockwise direction.

Assuming that the contacts 88 remain closed a sufficient time for the control member 85 to be driven through a ninety degree angle, it will be observed that the energizing circuit of the motor 96 will be broken as soon as the conducting segment 85 is driven through an angle of ninety degrees by reason of the disengagement of the control member 85 with the conducting segment 95. It will be understood that a drum controller (not shown) is driven by the motor 96 by means of the bevel gears 107 and the drum controller shaft 108, the latter shaft corresponding in function to the shaft 59 of Fig. 1. Therefore the speed and load of the feed water motor (not shown) will always be a function of the feed water required by the boiler.

If the steam pressure increases sufficiently to cause the rod 83 to close the contacts 110 it will be seen that the series field 111 of the motor is energized to cause a counter-clockwise rotation of the motor 84. The control member 85 is thereby driven in a clockwise direction to engage the conducting segment 112. The series field 113 of the motor 96 is thereupon energized to drive the controller shaft 108 and the conducting segment 112 in a clockwise direction until the control member 85 is again in its neutral position between the two conducting segments 95 and 112.

While I have shown particular embodiments of my invention, it will be understood of course that I do not wish to be limited thereto since many modifications may be made, and I therefore contemplate by the appended claims to cover any such modifications that fall within the true spirit and scope of my invention.

What I claim as new and desire to secure by Letters Patent of the United States, is:

1. In a speed control system, a dynamo electric machine subject to varying load demands, a source of supply therefor, load demand means operated in accordance with the speed control desired, a speed controlling means, operating means therefor, a differential mechanism connected to said speed controlling means and to said operating means for controlling the output of said machine, and means responsive to a predetermined reduction of voltage of said source of supply for controlling said operating means to operate said speed controlling means to a position corresponding to the minimum output of said machine.

2. A control system for electric motors and the like, comprising speed varying means operable through a plurality of positions for said motor, a differential mechanism having pinion gears and bevel gears, means for operating one of said bevel gears in response to a condition to be regulated, a driving connection between the other of said bevel gears and said speed varying means, and a control cam mechanically supported from said pinion gears for operating said speed varying means to one of its positions in accordance with the movement of said first mentioned bevel gear.

3. In combination, a motor, a speed controlling resistance for said motor, a drum controller for varying said resistance, a differential mechanism provided with bevel gears and pinion gears, a control cam having three lobes, means supporting said cam from said pinion gears for rotation therewith, driving means connected to said drum controller and to one of said bevel gears, means for operating the other of said bevel gears in response to a condition to be regulated, a rider operatively associated with said cam for controlling said driving means to increase the speed of said motor whenever said rider is engaged by one of said lobes, and for decreasing the speed of said motor whenever the rider is engaged by another of said lobes.

4. A speed controller for an alternating current motor having a speed controlling resistance connected in the secondary circuit thereof, a drum controller for varying said resistance, a reversible motor for driving said drum, direction controlling switches for said reversible motor, a differential mechanism provided with bevel gears and pinion gears, a three lobe cam, mechanical connections extending from said cam to said pinion gears for the rotation of said cam by said gears, means for rotating one of the bevel gears of said mechanism in response to a desired speed change of said alternating current motor, a driving connection between the other of said bevel gears and said reversible motor, a rider for said cam arranged to be operated by the lobes thereof to control selectively the energization of said switches whereby the speed of said alternating current motor is determined as a function of the speed control which is required.

5. A speed controller for an alternating current motor having a speed controlling resistance connected in the secondary circuit thereof, a drum controller movable through a plurality of positions for varying said resistance, a reversible motor for driving said drum controller, direction controlling switches for said reversible motor, a differential mechanism provided with bevel gears and pinion gears, a three lobe cam, mechanical connections extending from said cam to said pinion gears for the rotation of said cam by said gears, means for rotating one of said bevel gears of said mechanism in response to a desired speed change of said alternating current motor, a driving connection between the other of said bevel gears and said reversible motor, a rider for said cam arranged to be operated by the lobes thereof to control selectively the energization of said switches whereby the speed of said alternating current motor is determined as a function of the speed control which is required, and positioning means mounted on said controller for energizing one of said direction switches until said controller is driven to one of its positions.

6. A speed control system for an alternating current motor having a speed controlling resistance connected in the secondary circuit thereof, a drum controller for varying said resistance, a reversible motor for driving said drum, differential mechanism provided with bevel gears and pinion gears, a three lobe cam arranged to be driven by the pinion gears, means for rotating one of said bevel gears of said mechanism in response to a desired speed change of said alternating current motor, a driving connection between the other of said bevel gears and said reversible motor, a rider for said cam arranged to control the energization of said reversible motor in accordance with its relation to the lobes of said cam, and means responsive to a predetermined reduction of voltage on said alternating current motor for controlling said reversible motor to operate said drum controller to a position corresponding to the minimum speed of said alternating current motor.

7. In combination, a motor, a resistance for controlling the speed of said motor, a controller for varying by predetermined steps the value of said resistance, a reversible motor for driving said controller, direction controlling switches for said reversible motor, a differential mechanism provided with bevel gears and pinion gears, means for rotating one of said bevel gears in response to a condition to be regulated, a driving connection between the other of said bevel gears and said reversible motor, a control cam for controlling the operation of said direction switches, means supporting said cam from said pinion gears for rotation therewith so that said reversible motor operates said controller to vary the speed of said motor in accordance with the movement of said cam, an interlock switch operated to a closed position by the closing of one of said direction switches, and a plurality of positioning teeth on said controller for completing a holding circuit for said one of said direction switches to cause said controller to be operated to one of said steps, the said holding circuit including said interlock switch.

8. A speed control system for an electric motor subject to varying load demands, a speed controlling resistance for said motor, load demand means operable in accordance with the speed desired, a controller arranged to be driven to any one of a plurality of positions for controlling said resistance, a reversible motor for driving said controller, a differential mechanism provided with a pair of driving elements and a driven element, said driving elements being connected respectively to said controller and to said load demand means, control means operatively associated with said driven element for controlling the energization of said reversible motor in accordance with the movement of said driven element whereby said reversible motor operates said controller an amount corresponding to the operation of said load responsive means, and positioning means rotatable with said controller for modifying the action of said control means so that said controller is always driven to one of its positions.

9. A speed control system for an induction motor subject to varying load demands, a speed controlling resistance connected in the secondary circuit thereof, a drum controller operable through a plurality of positions for varying said resistance, a reversible motor for driving said drum controller, direction controlling switches for said reversible motor, a differential mechanism provided with two driving elements and a driven element, load responsive means connected to one of said driving elements for rotating said element an amount corresponding to a desired speed change of said induction motor, connections for connecting said other driving element to said reversible motor, a three-lobe cam arranged to be rotated by said driven element, and a circuit controlling rider normally occupying a position against the intermediate lobe of said cam for selectively controlling the energization and deenergization of said direction controlling switches whereby said reversible motor operates said controller an amount corresponding to the operation of said load responsive means.

10. A control system for a dynamo-electric machine subject to varying load demands comprising a resistor for controlling the output of said machine, a controller operable through a plurality of positions for controlling said resistor, a reversible motor for driving said controller, direction controlling switches for said motor, a differential mechanism provided with two driving elements and a driven element, load responsive means connected to one of said driving elements for rotating said element an amount corresponding to a desired output of said machine, connections for connecting said other driving element to said reversible motor, a three-lobe cam operatively connected for rotation with said driven element, circuit controlling means for said direction switches, and means normally engaging the intermediate lobe of said cam for operating said circuit controlling means whereby said reversible motor operates said controller an amount corresponding to the operation of said load responsive means.

GUY A. MOFFETT.